United States Patent [19]

Davies

[11] Patent Number: 5,410,586
[45] Date of Patent: Apr. 25, 1995

[54] METHOD FOR ANALYZING AN IDNX NETWORK

[75] Inventor: Stephen W. Davies, Dallas, Tex.

[73] Assignee: MCI Communications Corporation, Del.

[21] Appl. No.: 866,068

[22] Filed: Apr. 10, 1992

[51] Int. Cl.$^6$ .................. H04M 1/24; H04M 15/00
[52] U.S. Cl. .................... 379/14; 379/11; 379/16; 379/137; 379/138
[58] Field of Search ............ 379/10, 11, 14, 16, 379/113, 137, 138, 221, 112, 115, 133–136; 370/16, 118, 54, 60, 60.1, 17; 375/122

[56] References Cited

U.S. PATENT DOCUMENTS

| | | | |
|---|---|---|---|
| 4,737,983 | 4/1988 | Frauenthal et al. | 379/113 |
| 4,756,019 | 7/1988 | Szybicki | 379/221 |
| 4,991,204 | 2/1991 | Yamamoto et al. | 370/16 |
| 5,031,211 | 7/1991 | Nagai et al. | 379/221 |
| 5,042,027 | 8/1991 | Takase et al. | 379/133 |
| 5,043,938 | 8/1991 | Ebersole | 370/85.15 |
| 5,065,392 | 11/1991 | Sibbitt et al. | 379/112 |
| 5,068,892 | 11/1991 | Livanos | 379/113 |
| 5,121,342 | 6/1992 | Szymborski et al. | 375/10 |
| 5,142,526 | 8/1992 | Moriue et al. | 375/14 |
| 5,164,983 | 11/1992 | Brown et al. | 379/112 |
| 5,175,537 | 12/1992 | Jaffe et al. | 379/113 |
| 5,182,750 | 1/1993 | Bales et al. | 379/221 |

*Primary Examiner*—Stephen Chin
*Assistant Examiner*—Vijay Shankar
*Attorney, Agent, or Firm*—Pollock, Vande Sande & Priddy

[57] ABSTRACT

A method for simulating an IDNX (integrated digital network exchange) network. Trunk and call information is downloaded from a network controller connected to the IDNX network to a personal computer. Call data is obtained defining each call placed over the network. Link data is also obtained describing the links over which the call is placed. The link data is arranged in two arrays, one defining a pointer based on the identity of connected nodes. The pointers point to a table which describes the link interconnecting the nodes. A call circuit table identifies each of the calls over the network. The call is placed on the model by debiting the in use bandwidth field of the table describing each link used in the call. Once calls are placed, an analysis of network performance is possible. Calls may be rerouted over the simulated model to evaluate different network configurations.

12 Claims, 4 Drawing Sheets

METHOD FOR ANALYZING AN IDNX NETWORK

The present invention relates to telecommunication networks. Specifically, a method for modeling and analyzing communication networks for optimizing network topology is described.

IDNX network (Integrated Digital Network Exchange) systems are in place for voice and data communication for diverse locations within the United States. These networks include from 2 to 250 nodes which originate and receive communication traffic of all types. The various nodes are interconnected by numerous trunks to provide sufficient bandwidth to carry the communication traffic between nodes. The networks may support several thousand calls at a given time.

These systems strive to maintain and utilize the trunk capacity in a way which will service all calls with the highest quality. The network structure, or topology, will impact on the ability to efficiently route calls. The number of trunks should be kept to a minimum and yet be sufficient to make sure excess capacity exists on the network to handle any emergency or temporary failures of trunks in use.

As part of the procedure for optimizing network topology so that calls are efficiently routed between nodes, the various traffic patterns and bandwidth use between nodes carrying the traffic must be analyzed. In carrying out optimization of network topology, the central fixed parameter is the bandwidth requirements for the communication traffic between origination and destination locations. As a performance indication, the total of in-use backbone bandwidth to total backbone bandwidth is a parameter which is a composite measure of the utilization of the network.

Another indication of network performance is a composite measure of the routing efficiency which is the average number of hops that a call takes between nodes in order to reach its destination. This parameter is effectively the reciprocal of bandwidth efficiency and represents the bandwidth-weighted number of hops in the network. As an example of this parameter, a large call, such as 512K or 1.344M routed over many hops will have more of an impact on the average number of hops than a small call, i.e., 9.6K or 56K routed over many hops. Since a central concern of network efficiency is to conserve backbone bandwidth, routing of such calls with a minimum number of hops becomes of prime importance.

Effective management and topology optimization requires that specific solutions to the problem of network efficiency be proposed and implemented. Obviously, in an operational network, considerable limitations are placed on the ability to try various solutions without the risk of disrupting the network. This is also complicated by the fact that making changes on the network, i.e., the deletion or addition of trunks or nodes, is a considerable engineering undertaking and an expense which may not be worth the effort.

Thus, the problem of network optimization requires an analysis tool which is capable of gathering a complete and accurate picture of traffic and network topologies which currently exist in a network which is subject to optimization. This information will permit the various hypotheses and solutions for network optimization to be tried without interruption to the operating network.

SUMMARY OF THE INVENTION

It is an object of this invention to model an IDNX communications network to permit it to be analyzed and modified.

It is a more specific object of this invention to simulate traffic on a communication network to analyze the network's efficiency, survivability and performance.

It is yet another object of this invention to provide a model of a communications network which can be analyzed and which will permit various optimization solutions and traffic routes to be investigated.

These and other objects of the invention are provided by a method which produces a model of an active voice and data communications network. The model is derived by loading trunk and call information relating to an operational IDNX network to a computer file. An IDNX network node controller is connected to each node of the network. One controller will supply call records for all nodes in response to an inquiry to the call control block of the controller operating software. These records include all information sufficient to describe a call being placed over the network. Additionally, by accessing the same control block of the IDNX operating software, link records may be obtained which describe the inter-connection among nodes of the network. In accordance with the invention, this loaded interconnection data is configured as a plurality of link records. The records include the total bandwidth available and total bandwidth in use for each of the links.

A corresponding call circuit table is created, identifying each call which was placed over the network. Calls are placed on the links in the link records by incrementing the in use bandwidth needed for the call. The network can be used to place other calls and simulate failures of various trunks which make up the links.

Calls are placed during simulation by identifying a link path connecting the nodes from an origination to destination node with a routing algorithm. The corresponding link records of the located links forming the path have an in use bandwidth which is incremented with the call bandwidth. Once all calls are placed and set up in the model, the simulated network contains all information relating to the performance criteria of the network such as bandwidth utilization and bandwidth efficiency. Thus, for each network configuration selected by the user, an analysis may be performed to identify the various performance criteria for the reconfigured network.

DESCRIPTION OF THE PREFERRED EMBODIMENT

Figure 1:
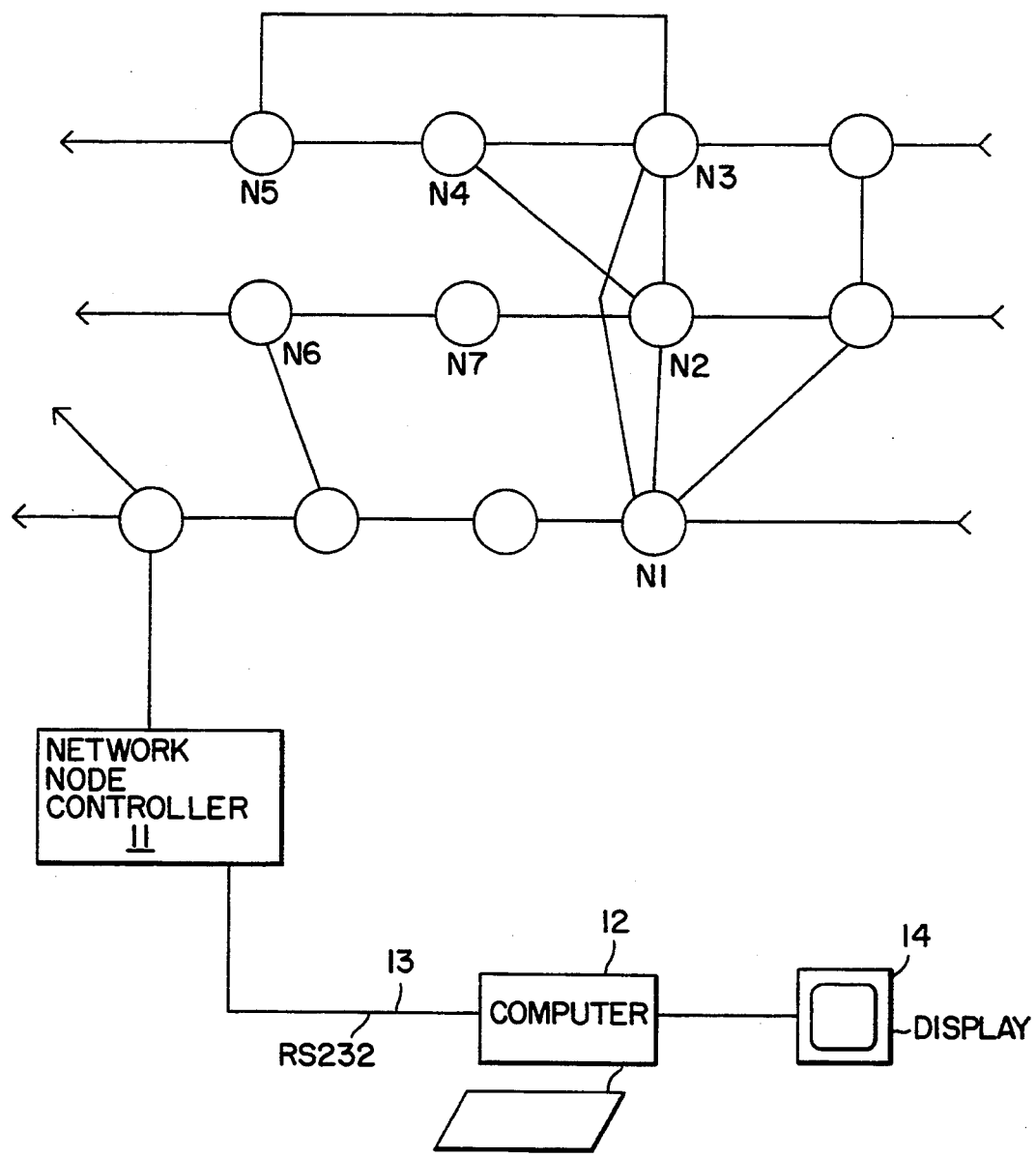
FIG. 1 illustrates a network topology which is to be simulated by the invention.

FIG. 1 illustrates the network structure of a voice data distributed communications network. The network structure includes a plurality of nodes N1 through Nn and a plurality of links L interconnecting the nodes. Multiple trunks make up a link for interconnecting nodes in order to have the required link bandwidth to accommodate the communication traffic between nodes.

The structure shown has three levels associated therewith, each of which comprises essentially horizontal trunk structures. The three levels are interconnected by additional vertical link/trunk structures to permit communication between various levels of the network. Each node may serve as a destination or originator for voice data traffic carried by the network.

The network node controller 11 is connected to the IDNX network which maintains real time records of the routing of every call in the network. These records can be obtained by a personal computer 12 having a display 14 connected to a standard RS232 interface 213 connected to the network analyzer 11. The particular records which are available from a call control block of the IDNX software running in the network analyzer, include the following call data file record, which describes the call path, origination node, destination node, bandwidth, call priority and pre-empt priority for a call placed over the network.

CCB DISPLAY (FROM NODE 3)
SOURCE NODE 3(SFOC) IS ORIGINATION
ORIG PORT=N3C9PO, DEST-PORT=N32C25P1, CHANNEL TYPE=TA
CALL PRIORITY=12, PREEMPT PRIORITY=12
BAND WIDTH=9600 BPS
OUTBOUND TRUNK 23 TO NODE 1(SNFCO1-1) (TRUNK CHANNEL C23P124)
CALL HAS BEEN UP FOR 472793 SECONDS
CALL HAS BEEN RECONNECTED
CALL PATH: 3(ORIG)-1-32 (DEST)

The foregoing example indicates that there is a virtual connection from node 3 to 32 using the physical links 3 to 1 and 1 to 32.

Link data for the network is available by issuing a software inquiry to the IDNX network analyzer 11 to obtain link data. The following link data file which is downloaded from the network analyzer 11 describes the link end points and the link bandwidths for each of the links interconnecting nodes over the network.

create link information for describing the network. A link table is established from the link data file which will describe each of the links connecting nodes within network 10.

A link matrix is created identifying each of the links by their end points which terminate on a node. In a link matrix, where each node is represented in a column and in a row, a link is established by placing a unique numerical pointer value at the intersection of the rows and columns of the connected nodes. Each pointer identifies a link record which describes the link.

The link record takes the form of:
size [1000][8]
contains 8 entries for up to 1000 links
Ld[x][0]: # of trunks in link
Ld[x][1]: total link bandwidth
Ld[x][2]: trunk BW
Ld[x][3]: trunk BW
Ld[x][4]: trunk BW
Ld[x][5]: trunk BW
Ld[x][6]: link bandwidth in use
Ld[x][7]:
where X is the pointer value.

The link records obtained from the network analyzer include data indicating a link between nodes 1 and 2, as well as indicating the connection from node 2 to node 1 since the network controller compiles individual records about each node. The redundant data is removed in the process of creating the link records.

The model resorts to the value of the pointer in the foregoing link matrix to find the related link description record. The above link description record establishes the number of trunks involved in the link, total bandwidth of the link and the various individual bandwidths of the trunks comprising the link. As useful information in establishing network performance, link bandwidth in use is incremented every time a call is placed over an affected link.

In addition to the link configuration, the model requires call data for defining each call placed over the network. Downloaded files from the IDNX network controller contain a substantial amount of duplicate

| LINK N8N1 CONFIGURATION | | BANDWIDTH | | | T-BUS | | | ZERO |
| --- | --- | --- | --- | --- | --- | --- | --- | --- |
| TRUNK CARDS | STATUS STATE | AVAIL | INUSE | RSRVD | AVAIL | SAT | ENC | SUPPR |
| N8C8 –N1C8 | ACTIVE UP –UNBLOCKD | 1484.0 | 0.0 | 0.0 | 2032 | NO | YES | BEZS |
| N8C24 –N1C24 | ACTIVE UP –UNBLOCKD | 780.0 | 704.0 | 0.0 | 1328 | NO | YES | BEZS |
| N8C40 –N1C40 | ACTIVE UP –UNBLOCKD | 1420.0 | 64.0 | 0.0 | 1968 | NO | YES | BEZS |
| N1C8 –N8C8 | ACTIVE UP –UNBLOCKD | 1484.0 | 0.0 | 0.0 | 2032 | NO | YES | BEZS |
| N1C24 –N7C24 | ACTIVE UP –UNBLOCKD | 780.0 | 704.0 | 0.0 | 1328 | NO | YES | BEZS |
| N1C40 –N7C40 | ACTIVE UP –UNBLOCKD | 1420.0 | 64.0 | 0.0 | 1968 | NO | YES | BEZS |

From these records a model is created by the application software running in the personal computer 12.

Figure 2:
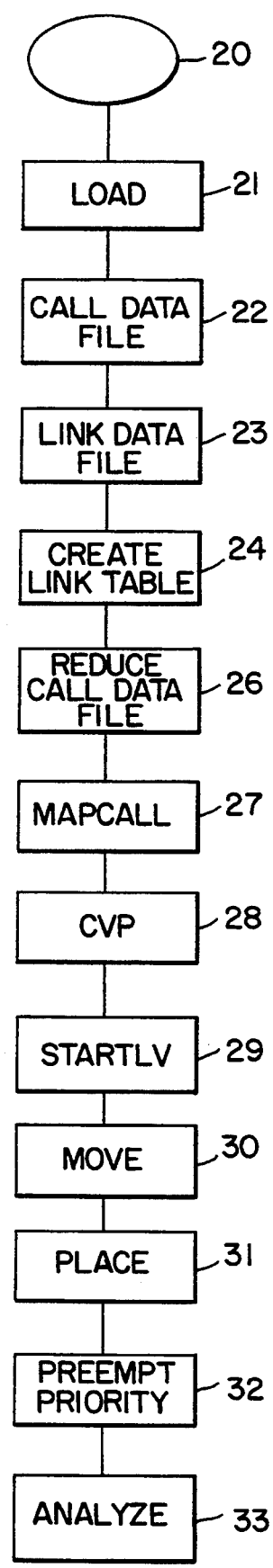
FIG. 2 illustrates the method in accordance with a preferred embodiment for modeling the network of FIG. 1 and analyzing the resulting structure.

Referring to FIG. 2, there is an illustration of how the data is collected for creating the model and the steps necessary to create and place a call over the model. At the beginning of the process 20, the files from the IDNX network analyzer 11 are downloaded to obtain the foregoing call data record and link data records. During the load function 21, each of these record files is stored in RAM location of the personal computer 12. The computer 12 typically will include at least 640K of internal RAM for holding all of the data.

Various pieces of data are extracted from the call data file record 22 for building the model. Further, the link data file is retrieved in step 23 and is similarly used to information. The call data files describe the call structure of each node, whether the node is involved in originating voice data traffic or is a destination for voice data traffic, or is an intermediate node through which such traffic passes. Thus, a call which takes up four nodes, i.e, an origination node, two intermediate nodes and a destination node, would have four control block node records associated with it. In accordance with the preferred embodiment of the present invention, this data is reduced to a call circuit description which will identify the number of hops, i.e., origination and destination node, as well as the particular intermediate nodes involved in the call. The call circuit description table is summarized below.

size [2500][13]

dh[x][0]: # of hops
dh[x][1]: from node
dh[x][2]: to node
dh[x][3]: origination
dh[x][4]: intermediate node
dh[x][5]: intermediate node
dh[x][6]: intermediate node
dh[x][7]: intermediate node
dh[x][8 ]: destination
dh[x][9]: call priority
dh[x][10]: preempt priority
dh[x][11]: call status
dh[x][12]: synchronous status
dh[x] dbw: bandwidth of call In accordance with the preferred embodiment, every call up to 2500 calls will have a record in accordance with the foregoing circuit description table.

The first entry of a circuit description table will identify the number of hops the call takes. Fields 1 through 8 describe the various nodes involved in the call. Fields 9, 10 and 11 relate to the call priority preempt priority and call status for some calls, field 12 the synchronous status, and bdw the call bandwidth.

In creating the circuit description table for each call placed over the network, data files of the call control block records retrieved from the network analyzer are analyzed to derive the foregoing table. In creating the table, the reduction of record files is accomplished by a routine CALL CON 26. The CALL CON routine 26 converts the text string call record into individual integers for the call circuit table. In addition, the MAP CALL routine 27 sorts through the text string call records received from the network analyzer to determine the number of hops a call takes from origination to destination node, and MAP CALL 27 stores the data in the foregoing fields. A second routine CVP 28 will similarly sort the node records received from the IDNX network analyzer to find the call priority or preempt priority information for the call circuit table. This routine as well converts the text string data of the record into integers for inserting in the call description table.

It can be seen that a simulation model can be produced which has link records describing the interconnection between nodes of the network and each call placed over the various nodes in links which interconnect the nodes.

The simulated network is placed into operation by placing calls in the call circuit table over the link table records. The call circuit table entry identifies each node and each link involved in the call. The origination node is shown in the circuit table as being connected to the first intermediate node. The link matrix will include for these node pairs a pointer which will point to the link record for the link connecting the node pair.

The link record for the node pair is then consulted and the link bandwidth Ld[x][6] is incremented, indicating that at least partial bandwidth is used for a given link. This process is repeated for the links connecting the first intermediate node to the next node and the subsequent nodes from the circuit description table until the destination node is reached. In each case, the link matrix is consulted for the pointer which identifies the link connecting each pair of nodes and a bandwidth increment is entered. Thus, at the conclusion of placement of all the calls over the network, each of the links are identified in the call, and the associated bandwidth necessary for the call is established by incrementing the bandwidth in use for each of the links from the call bandwidth in the call circuit table. Further, the model now can identify which calls are on each link. As will be seen in the features of analyzing and testing the survivability of the network under various scenarios, calls can be rerouted by moving them from a link, and restoring the link bandwidth which was previously incremented, and otherwise searching for additional paths over which to place calls in a failure scenario or in a redesign.

Throughout the process of placing calls, Ld[x][1] will contain the maximum bandwidth of the link. Thus, each link bandwidth cannot be incremented to a value which exceeds Ld[x][1].

If a call is to be placed over the simulated network, the STARTLU program will begin by noting the origination node and the destination node for the call. These two nodes can be represented as X and Y. A routing algorithm is consulted to determine the best path over which to send the traffic to arrive at the destination node Y from the origination node X. This routing algorithm can be a simple routine which determines whether there is a link path between node X and node Y. The link matrix is consulted for the value of the pointer which would be associated with such a link. If no pointer is found in the link matrix, then there is no connection between X and Y and additional nodes must be searched. The process then continues by checking the potential connections between X and Z. If these two nodes have a link, as determined by the presence of a pointer in a link matrix interconnecting the two nodes, then a check to determine whether the requisite call bandwidth is available over the potential link must be made. If in field 6 of the link record for the pointer associated with X and Z, a sufficient bandwidth is present, without exceeding the total link bandwidth in Ld[x][1], this is a potential route for the call.

The process continues by consulting whether there is a connection between Z and Y. If there is such a connection, as verified by the presence of a pointer in the link matrix, then the bandwidth is consulted in both Ld[x][6] and Ld[x][1] to determine if this is a feasible path for the call.

Once a path is found through intermediate nodes which are connected by links having the available bandwidth for the call, the link bandwidth for each of the connecting links is incremented with the call bandwidth from the call circuit table.

Thus, placing a call over the simulated model can be done with very simple algorithms or more complex ones depending on the model designer's choice.

The survivability of the network may be checked in a routine 30 by identifying links which are to be failed or otherwise taken out of service. For instance, a link between nodes A and B could be deleted to simulate a failure, and it is possible to use the model to re-place the call on other paths within the network. This requires invocation of the MOVE routine 30 which will first consult the link matrix to identify the links interconnecting nodes A and B. Once the pointer associated with the link from A to B is found, pointing to the link record which makes the internodal connection, the connection is removed (simulating a failure) by changing the value of the pointer to a zero, which will remove the link record associated with the pointer from consideration.

Having once deleted a link in a network, it is then necessary to re-place the call over a different path. This is accomplished by going to PLACE 31. During the call replacement PLACE 31 will exclude placing the call over the deleted link between nodes A and B since the pointer value is zero. Thus, other nodes will be consulted other than A and B to find a path to re-place the call which has been taken off the link interconnecting A and B.

If a call path cannot be found having bandwidth to support the new call, PLACE 31 will again attempt to find a route for the call without consideration of bandwidth availability. In this second attempt to find a route, the PLACE routine will locate a route without regard to bandwidth availability.

At this time a new routine is invoked, PREEMPT PRIORITY 32, which will check the found route to determine whether calls on the located route are eligible for replacement by a call which PLACE is attempting to route. This PREEMPT PRIORITY routine 32 will determine the call priority of every call on every link in the proposed route. Those calls having a call priority lower than a preempt priority of the call to be placed over the route will be identified. If sufficient bandwidth can be obtained by removing the located calls of lower priority, then these calls are removed such that the replacement call can be made over the links formerly occupied by the removed calls. The call is then placed once these lower priority calls have been identified and removed.

The preempt priority routine 32 will then attempt to place the removed calls by making similar judgments concerning available routes and the priority of calls on the routes. The preempt priority routine is a recursive process such that the very lowest order calls end up being moved off the network in favor of calls having a higher preempt priority.

The call priority of the existing calls carried by the links is checked with respect to the call preempt priority of the call being placed by consulting dh[x][9] and dh[x][10]. A call having a higher preempt priority will replace a call having a lower call priority if the removal of the existing call produces the necessary bandwidth to support the call being placed.

The call status field of the call circuit description table dh[x][11] identifies whether the call has been placed or not. Once a successful placement of the call occurs, it is written with a logical one (1).

Thus, it can be seen that the foregoing simulation model can be reconfigured to test various scenarios which can occur over the real network without disturbing the real network.

The network configuration may be analyzed in an analyze routine 33. Once having made changes to the simulated network, it is possible to determine how certain key performance indicators of the network have changed. Bandwidth efficiency and bandwidth utilization are readily determined, along with the number of trunks and the amount of traffic which is in the network.

Figure 3:
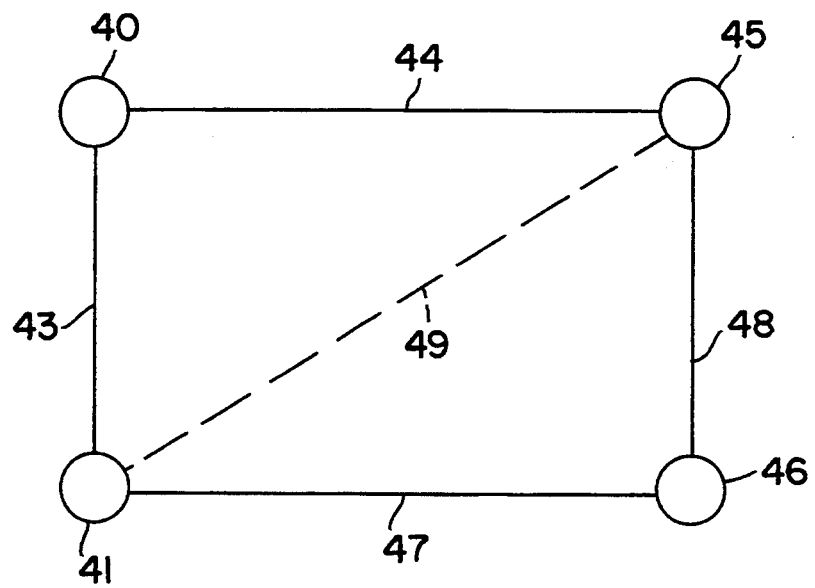
FIG. 3 illustrates the effect of network topology on performance.

As an example, consider a 500 MBPS call routed between two adjacent nodes 40, 41 of FIG. 3. The model will permit the identity of the link 43 between the two nodes to be determined, and by consulting the link table, the amount of bandwidth utilized for all calls on the link can be readily determined from field 6 the link record, Ld[x][6] link bandwidth in use. The bandwidth utilization is calculated for this network as the bandwidth in use to total bandwidth available. Reference again to the link table will illustrate the total bandwidth available in Ld[x][1] for an analysis of the bandwidth utilization.

The bandwidth utilization takes on added significance when communications occur over non-adjacent nodes. Specifically, when a call is placed between two nodes 41 and 45 which are in diagonal corners of a network consisting of 4 nodes, the call occupies bandwidth on two links 43, 44. If each of 4 links (43, 44, 47, 48) connecting the various nodes has a bandwidth capability of 1 Mbs, the total network bandwidth is 4 Mbs. For a call having a 500 Kbps bandwidth, the bandwidth utilization would be (500 Kbps+500 Kbs)/4Mbs or 25%. The same call between adjacent nodes would result in a bandwidth utilization of (500 Kbs)/4 mbs or 12.5% since only one link was in use.

In a more complex scenario, assume there are 40 or 50 calls between two non-adjacent nodes of the 4 node network. Each call would occupy two links, 43, 44 one up and one over, i.e., vertical and horizontal. A bandwidth utilization calculation for each of the links would indicate a healthy utilization, but the utilization may be artificially high because the trunks are not routed efficiently for traffic. Thus, for the 40 or 50 calls which may be on the network, this performance factor may be misleading, since a diagonal trunk 49 would clearly improve performance.

The model will permit calculation for the entire network a bandwidth efficiency factor, KPI, which may be a more realistic evaluation for the 4 node network. Bandwidth efficiency is the ratio of total traffic carried to total in use backbone bandwidth. For each link involved in a call, the individual backbone bandwidths in use would be added together to arrive at a total in use backbone bandwidth. The bandwidth efficiency would be the total traffic for the circuit to total backbone bandwidth in use of the links. The bandwidth efficiency is a composite measure of the routing efficiency of the network. This performance factor is dependent upon the number of links use for a given call. As the number of links involved in the call increases, the bandwidth efficiency of the network decreases. Thus, as more calls which require multiple links increases, the network bandwidth efficiency disadvantageously decreases.

Thus, for various routing scenarios employed by the network designer, the performance index of bandwidth efficiency may be calculated to determine the most optimum routing for calls within the network.

Experience has shown that the bandwidth utilization levels and bandwidth efficiency are effective network performance indicators.

To more efficiently route the traffic, systems designers may wish to reduce the number of trunks, increase the bandwidth utilization, increase bandwidth efficiency and insure the survivability if a given link becomes unavailable. In laying out a new network topology, it might be advantageous to eliminate horizontal trunks as there may be little horizontal traffic along each level. The operator may resort to reassigning the traffic appearing on horizontal trunks of a given level.

Figure 4:
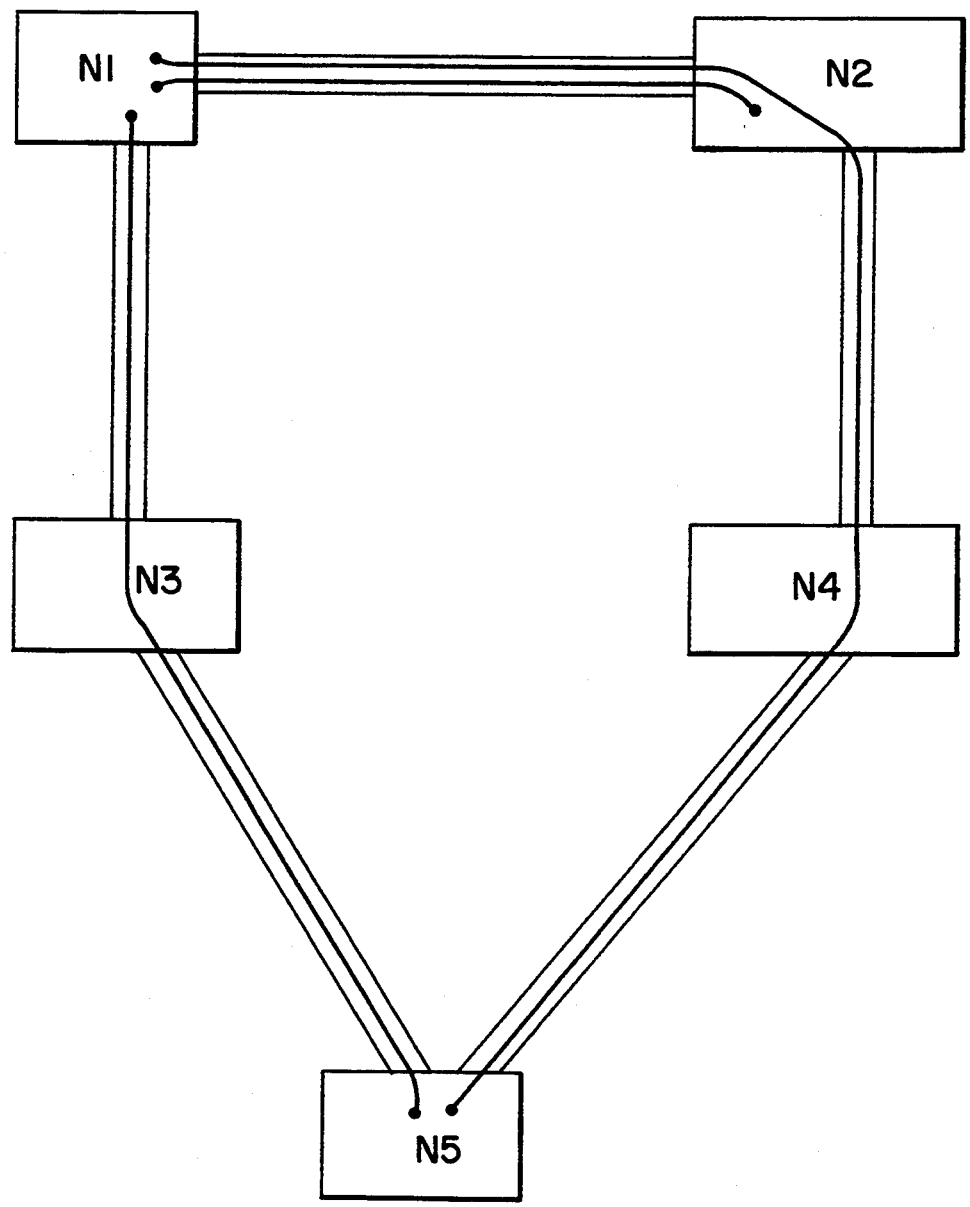
FIG. 4 is an example of a modeled 5 node network.

An example of the simulation of only five nodes, N1, N2, N3, N4 and N5 as shown in FIG. 4 which have the following three calls associated therewith will be described:

Call A from N1 to N5 occupying 100 Kbs;
Call B from N1 to N2 having 100 Kbs;
Call C from N1 to N5 also having 100 Kbs of bandwidth.

In the model all numbers represent 100's. For example, a 100K call is shown as 1000. A megabit trunk is represented by 10,000.

The nodes are connected as shown in FIG. 1 by 1 megabit trunks. The link matrix for this interconnection of nodes would appear as follows:

|   | 1 | | | | | | |
|---|---|---|---|---|---|---|---|
|   | 0 | 1 | 2 | 3 | 4 | 5 | ... 250 NODE # |
| 0 | 0 | 0 | 0 | 0 | 0 | 0 |   |
| 1 | 0 | 0 | 1 | 2 | 0 | 0 |   |
| 2 | 0 | 1 | 0 | 0 | 3 | 0 |   |
| 3 | 0 | 2 | 0 | 0 | 0 | 4 |   |
| 4 | 0 | 0 | 3 | 0 | 0 | 5 |   |
| 5 | 0 | 0 | 0 | 4 | 5 | 0 |   |
| . |   |   |   |   |   |   |   |
| NODE # 250 |   |   |   |   |   |   |   |

As can be seen a pointer is shown to identify the presence of a connection between nodes

| N1, N2 | 1 | N3, N1 | 2 | N5, N3 | 4 |
|---|---|---|---|---|---|
|        |   | N1, N3 | 2 | N3, N5 | 4 |
| N2, N1 | 1 | N4, N2 | 3 | N5, N4 | 5 |
|        |   | N2, N4 | 3 | N4, N5 | 5 |

The link records identified by these pointers representing the connections between those nodes are shown below. These link records illustrate in position 0 the number of trunks. The total link bandwidth which exists between the nodes is in position 1. The bandwidth of the single trunk forming each link is in position 2. The trunks each have a bandwidth of 1Mbs (represented by 10,000).

|   | Pointer | | | | | | |
|---|---|---|---|---|---|---|---|
|   | 0 | 1 | 2 | 3 | 4 | 5 | 6 | 7 |
| 0 | 0 | 0 | 0 | 0 | 0 | 0 | 0 | 0 |
| 1 | 1 | 10000 | 10000 | 0 | 0 | 0 | 2000 | 1 |
| 2 | 1 | 10000 | 10000 | 0 | 0 | 0 | 1000 | 1 |
| 3 | 1 | 10000 | 10000 | 0 | 0 | 0 | 1000 | 1 |
| 4 | 1 | 10000 | 10000 | 0 | 0 | 0 | 1000 | 1 |
| 5 | 1 | 10000 | 10000 | 0 | 0 | 0 | 1000 | 1 |
| 6 |   |   |   |   |   |   |   |   |
| . |   |   |   |   |   |   |   |   |
| 1000 |   |   |   |   |   |   |   |   |

The call circuit table dh is shown for calls 0, 1 and 2 (in the example call A, B and C). As was illustrated with respect to the general configuration of the call circuit table, the first entry indicates the number of hops for the first call which is 1, i.e., there are no intermediate nodes, but merely an origination node 1 and a termination node 2. Further, a call priority of 7 is shown for each of the calls. The call status of 1 is shown, as is a synchronous status of 1.

For call B, there are three hops, beginning from node 1, ending at node 5, via nodes 1, 2, 4 and 5. Similarly, for call C, there are two hops from nodes 1 to node 5, occurring between nodes 1, 3 and 5.

The bandwidth for each call is shown in the call circuit table in dbw where 1000 equals 100 Kbs. These calls are placed by debiting column 6 of each link record (1 bw) with the call bandwidth.

From this simple example, it is clear that the performance parameters for these networks can be calculated by resorting to the foregoing simulation model. The bandwidth utilization and bandwidth efficiency are computed by the bandwidth criteria in the link records.

Thus, it has been shown that it is possible to create a model for doing network design changes, simulating all the call traffic as well as interconnections of nodes of a communications network. Those skilled in the art will recognize yet other embodiments described by the claims which follow.

What is claimed is:

1. A method for analyzing communication network performance comprising:
   interrogating a node controller of said communication network to obtain link data identifying links interconnecting nodes of said communication network, and call data representing logical connections between nodes of said communication network and representing calls placed over said communication network;
   creating from said link data and call data a model of said communication network defining the operation of each interconnection between nodes representing call traffic on said communication network; by storing said link data in a processor memory as a column and row of nodes which are end points of each link, said nodes constituting a row and column address of a location in an array which stores a pointer identifying a link record containing a link description of a link connecting said nodes defining said row and column address, and storing said call data in said processor memory as a circuit description table which identifies the origination nodes, destination nodes and intermediate nodes between said origination and destination nodes of any call on said communication network; and,
   evaluating from said model of said communication network performance for said call traffic.

2. The method according to claim 1 wherein said link description includes the number of trunks forming a link, the bandwidth of said link, and the link bandwidth in use.

3. The method according to claim 1 further comprising selecting a desired path over said model of said communication network for a new call to be made by determining which nodes are used in said new call, and

| Call # |   |   |   |   | dh |   |   |   |   |   |   |   |   |     |
|---|---|---|---|---|---|---|---|---|---|---|---|---|---|---|
|   | 0 | 1 | 2 | 3 | 4 | 5 | 6 | 7 | 8 | 9 | 10 | 11 | 12 | dbw |
| 0 | 1 | 1 | 2 | 1 | 2 | 0 | 0 | 0 | 0 | 7 | 7 | 1 | 1 | 1000 |
| 1 | 3 | 1 | 5 | 1 | 2 | 4 | 5 | 0 | 0 | 7 | 7 | 1 | 1 | 1000 |
| 2 | 2 | 1 | 5 | 1 | 3 | 5 | 0 | 0 | 0 | 7 | 7 | 1 | 1 | 1000 |
| 3 |   |   |   |   |   |   |   |   |   |   |   |   |   |   |
| 4 |   |   |   |   |   |   |   |   |   |   |   |   |   |   |
| . |   |   |   |   |   |   |   |   |   |   |   |   |   |   |
| 2500 |   |   |   |   |   |   |   |   |   |   |   |   |   |   | updating the link records pertaining to said links which interconnect said nodes with information pertaining to said new call.

4. The method of claim 3 further comprising an adjust routine for modifying data in said link records and said circuit description table to determine the effect of changes on said communication network from said new call.

5. The method of clam 4 further comprising an analyze routine to compute key performance indicators for said model of said communication network carrying said new call.

6. A method for analyzing communication network utilization comprising:
   forming a link record for each link between nodes of said communication network, said link record including information on the total bandwidth available and total bandwidth used over each link:
   creating a call circuit table identifying each call placed over said communication network, said call circuit table identifying for each call the nodes through which said call passes including a table of bandwidth data identifying the bandwidth of each call;
   modifying the total bandwidth used in each link record for each link carrying said call comprising the steps of:
   addressing a link pointer array by each pair of nodes through which said call passes to obtain a link record number from said link pointer array; and,
   incrementing a bandwidth in use in a link record identified by said record number with bandwidth data from said table of bandwidth data corresponding to said call.

7. The method of claim 6 further comprising simulating the placing of a call over said communication network comprising:
   defining an origination and destination node for a simulated call;
   entering in said call circuit table information relating to said simulated call:
   searching each link record and table of bandwidth data for a path between said simulated call origination node and simulated call destination node comprising the steps of:
   locating a series of links and intermediate nodes which connect said simulated origination and destination nodes together as well as having the required bandwidth to support said call; and, incrementing a bandwidth in use field for each link record of each located link with said required bandwidth to support said call.

8. The method of claim 7 further comprising analyzing the performance of the communication network with said simulated call from said link record.

9. The method of claim 6 further comprising simulating a failure on said communications network comprising:
   removing a call carried by a link defined by one of said link records; and,
   placing said removed call on another link in said link records.

10. The method of claim 9 further comprising analyzing said link records after said call has been placed on said another link to determine the effect of said call on said communications network.

11. The method of claim 7 further comprising determining for said communication network the bandwidth of said link records utilization by comparing the in use backbone bandwidth to total backbone bandwidth.

12. The method of claim 7 further comprising determining the efficiency of said communication network by calculating the ratio of data traffic bandwidth to network bandwidth in use in said link records.

* * * * *